US008555252B2

(12) United States Patent
He

(10) Patent No.: US 8,555,252 B2
(45) Date of Patent: Oct. 8, 2013

(54) APPARATUS AND METHOD FOR LOADING AND UPDATING CODES OF CLUSTER-BASED JAVA APPLICATION SYSTEM

(75) Inventor: Ling He, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 361 days.

(21) Appl. No.: 13/001,609

(22) PCT Filed: Oct. 1, 2010

(86) PCT No.: PCT/US2010/051087
§ 371 (c)(1),
(2), (4) Date: Dec. 27, 2010

(87) PCT Pub. No.: WO2011/062685
PCT Pub. Date: May 26, 2011

(65) Prior Publication Data
US 2011/0265071 A1  Oct. 27, 2011

(30) Foreign Application Priority Data

Nov. 23, 2009  (CN) .......................... 2009 1 0221980

(51) Int. Cl.
*G06F 9/44* (2006.01)
(52) U.S. Cl.
USPC ........................................ 717/122; 717/168
(58) Field of Classification Search
USPC ................................ 717/122, 168
See application file for complete search history.

(56) References Cited

U.S. PATENT DOCUMENTS

| | | | |
|---|---|---|---|
| 6,175,855 B1 * | 1/2001 | Reich et al. .................... | 709/202 |
| 7,206,910 B2 | 4/2007 | Chang et al. | |
| 7,519,964 B1 | 4/2009 | Islam et al. | |
| 7,533,389 B2 | 5/2009 | Verbeke et al. | |
| 7,716,377 B2 | 5/2010 | Harris et al. | |
| 2002/0188935 A1 * | 12/2002 | Hertling et al. ................ | 717/170 |
| 2004/0153558 A1 | 8/2004 | Gunduc et al. | |
| 2004/0163085 A1 | 8/2004 | Dillenberger et al. | |
| 2006/0036656 A1 | 2/2006 | Mercer | |
| 2006/0074994 A1 * | 4/2006 | Smits ............................ | 707/201 |
| 2006/0129989 A1 | 6/2006 | Fleischer | |
| 2006/0271395 A1 | 11/2006 | Harris et al. | |
| 2007/0088762 A1 | 4/2007 | Harris et al. | |
| 2009/0276483 A1 | 11/2009 | Lind et al. | |
| 2010/0070515 A1 | 3/2010 | Dutton et al. | |
| 2010/0114919 A1 | 5/2010 | Sandhu | |

OTHER PUBLICATIONS

Chinese Office Action mailed Mar. 14, 2013 for Chinese patent application No. 2009102219807 a counterpart foreing application of U.S. Appl. No. 13/001,609, 6 pages.

* cited by examiner

Primary Examiner — Wei Zhen
Assistant Examiner — Lanny Ung
(74) Attorney, Agent, or Firm — Lee & Hayes, PLLC

(57) ABSTRACT

The present disclosure discloses embodiments of an apparatus and method for loading codes of cluster-based Java application system. The loading techniques provided by the present disclosure do not need to publish the latest codes to each server in the cluster or restart the Java application in each server of the cluster. The loading techniques only need to update the codes in the codes storage server, such as a SVN server. Each server in the cluster will automatically load the latest codes, thereby improving the usability of the Java cluster system.

14 Claims, 6 Drawing Sheets

APPARATUS AND METHOD FOR LOADING AND UPDATING CODES OF CLUSTER-BASED JAVA APPLICATION SYSTEM

CROSS REFERENCE TO RELATED PATENT APPLICATIONS

This application is a national stage application of an international patent application PCT/US10/51087, filed Oct. 1, 2010, which claims priority from Chinese Patent Application No. 200910221980.7 filed on Nov. 23, 2009, entitled "APPARATUS AND METHOD FOR LOADING AND UPDATING CODES OF CLUSTER-BASED JAVA APPLICATION SYSTEM," which applications are hereby incorporated in their entirety by reference.

TECHNICAL FIELD

The present disclosure relates to the network data processing field, and more particularly relates to a search method and system.

BACKGROUND

Cluster-based systems are generally connected by multiple homogenous or heterogeneous computers to collaborate to complete a specific task. Cluster-based Java application system is a Java application system based on cluster deployment.

A general cluster-based Java application system, such as Java web application system or Java task cluster system, requires installation and deployment of necessary class database at client side for operation of the system. When there is a need to update the codes or class database, the updated codes need to be published to all servers in the cluster and the Java application in the servers needs to be restarted.

A current cluster-based Java application system typically requires re-loading or updating of the updated codes to all servers in the cluster no matter whether it is for update or re-loading of the codes. Consequently, Java applications need to be restarted in each server. With large work volume, this process tends to consume a lot of time and results in low efficiency.

SUMMARY OF THE DISCLOSURE

The purpose of the present disclosure is to provide an apparatus and method for loading and updating codes of cluster-based Java application system to implement efficient loading and update of codes.

To achieve the above purpose, the present disclosure provides techniques summarized below.

In one aspect, an apparatus, located at a server of a Java cluster, for loading codes of a cluster-based Java application system, the apparatus may comprise: a receiving unit, a finding unit, a determination unit, and a processing unit.

The receiving unit may receive a request from a server to load a class, the request including a class name of a first Java class to be loaded.

The finding unit may find a storing address of an entity of the first Java class from class registration information according to the class name, and obtains a latest version number of the first Java class according to the storing address.

The determination unit may determine whether the latest version number of the first Java class is same as a version number of the first Java class that is previously loaded and locally stored.

The processing unit may obtain the latest version of the first Java class from the storing address to load the class and updates the latest version number of the first Java class in class version records when the latest version of the first Java class is different from the version number of the first Java class that is previously loaded and locally stored. The processing unit may directly load the first Java class when the latest version of the first Java class is not different from the version number of the first Java class that is previously loaded and locally stored.

In one embodiment, the finding unit may record contents of the class registration information in a class address table.

In one embodiment, a primary key of the class address table may record the class name of the first Java class, and a value of the primary key of the class address table may record the storing address of the first Java class.

In one embodiment, the finding unit may record version information of the first Java class in a class version table.

In one embodiment, a primary key of the class version table may record the class name of the first Java class, and a value of the primary key of the class version table may record the version number of the previously loaded Java class.

In another aspect, a system for class registration used to maintain class registration information may comprise: a retrieval unit, an addition unit, and an updating unit.

The retrieval unit may obtain a Java class database according to a storing address of the Java class database.

The addition unit may traverse the Java class database and insert into the class registration information a new class that is unrecorded in class registration information and included in the Java class database.

The updating unit may traverse the Java class database and update the storing address of a corresponding Java class in the class registration information according to the respective storing address of each Java class recorded in the Java class database.

In one embodiment, the class registration information may comprise a class name, a class database name, and the storing address of the Java class database.

In yet another aspect, a method used at a server of a Java cluster, for loading codes of cluster-based Java application system, may: receive from a server a request for loading a class, the request including a class name of a first Java class to be loaded; find a storing address of the first Java class from class registration information according to the class name; obtain a latest version number of the first Java class according to the storing address; determine whether the latest version number of the first Java class is same as a version number of the first Java class that is previously loaded and locally stored; in an event that the latest version of the first Java class is different from the version number of the first Java class that is previously loaded and locally stored, load the latest version of the first Java class and updating the version number of the first Java class in class version records; and in an event that the latest version of the first Java class is not different from the version number of the first Java class that is previously loaded and locally stored, directly load the first Java class.

In one embodiment, contents of the class registration information may be recorded in a class address table. The contents of the class registration information that are recorded in the class address table may comprise: a primary key of the class address table recording the class name of the first Java class; and a value of the primary key of the class address table recording the storing address of the first Java class.

In one embodiment, contents of the class registration information may be recorded in a class version table. Version information of the first Java class recorded in the class version table may comprise: a primary key of the class version table recording the class name of the first Java class; and a value of the primary key of the class version table recording the version number of the previously loaded Java class.

In still another aspect, a method for class registration may: obtain a Java class database according to a storing address of the Java class database; insert into class registration information a new class that is unrecorded in the class registration information and included in the Java class database; and update the storing address of corresponding Java class in the class registration information according to the storing address of Java class recorded in the Java class database.

In one embodiment, the class registration information may comprise a class name, a class database name, and the storing address of the Java class database.

In this embodiment of the present disclosure, a receiving unit is configured to receive a request for loading class sent by a server. The request for loading class includes a class name of a first Java class to be loaded. A finding unit is configured to find a storing address of an entity of the first Java class from class registration information according to the class name, and to obtain a latest version number of the first Java class from a storing address of the first Java class according to the storing address. A determination unit is configured to determine whether the latest version number of the first Java class is the same as a version number of the first Java class that is previously loaded and is locally stored. A processing unit is configured to obtain a latest version of the first Java class from the storing address of the first Java class to load and to update the version number of the first Java class when the latest version of the first Java class is different from the version number of the first Java class that is previously loaded and is locally stored; otherwise to directly load the first Java class. The loading techniques provided by the present disclosure do not need to publish the latest codes to each server in the cluster, and do not need to re-start the Java applications of each server in the cluster. When the codes is updated in a codes storage server, such as SVN server, each server in the cluster can automatically loading the latest codes, thereby improving the usability of the Java cluster system.

DESCRIPTION OF DRAWINGS

To better illustrate embodiments of the present disclosure or techniques of the current technologies, the following is a brief introduction of Figures to be used in descriptions of the embodiments. The following Figures only relate to some embodiments of the present disclosure. A person of ordinary skill in the art can obtain other figures according to the Figures in the present disclosure without creative efforts.

DETAILED DESCRIPTION

Figure 1:
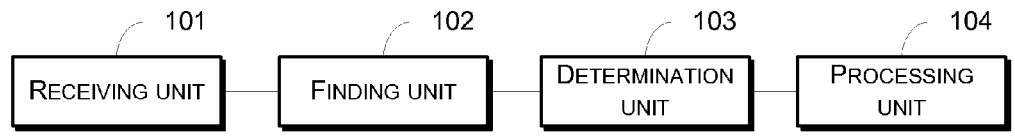
FIG. 1 illustrates a diagram of an apparatus of an exemplary embodiment in accordance with the present disclosure.

To enable a person of ordinary skill in the art better understand techniques in the present disclosure, the present disclosure, by reference to the Figures in the drawings, clearly and fully describes the techniques. The Figures only relate to some embodiments instead of all embodiments of the present disclosure. A person of ordinary skill in the art can obtain other embodiment according to the embodiments in the present disclosure without creative efforts. All such embodiments belong to the protection scope of the present disclosure.

FIG. 1 illustrates a diagram of an apparatus for loading a cluster-based Java application system in accordance with the present disclosure. The apparatus may be located in each server of the Java cluster. The apparatus includes a receiving unit 101, a finding unit 102, a determination unit 103, and a processing unit 104.

The receiving unit 101 is configured to receive, from a server, a request for loading class. The request for loading class includes a class name of a first Java class.

The first Java class refers to a Java class to be loaded in the request for loading class. For example, one Java class to be loaded is com.foo.helloworld.

The finding unit 102 is configured to find a storing address of an entity of the first Java class from class registration information according to the class name, and to obtain a latest version number of the first Java class from a storing address of the first Java class according to the storing address.

The class registration information can be recorded through a table. For example, in one embodiment of the present disclosure, a class registration table (ClassTable) records the class registration information.

The class registration table can be stored in a database to record the Java classes and the storing address of each Java class.

Figure 2:
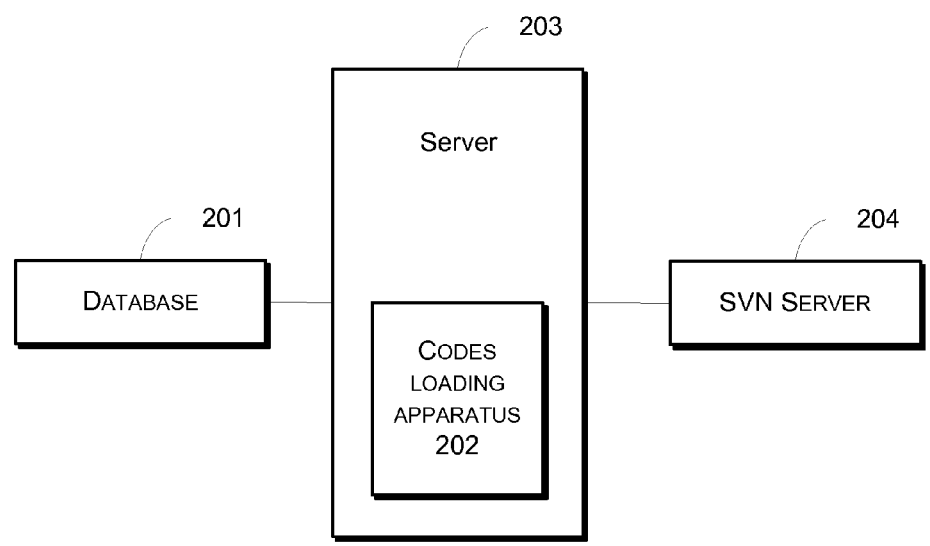
FIG. 2 illustrates a diagram of an apparatus of another embodiment in an application scenario in accordance with the present disclosure.

FIG. 2 illustrates a diagram of an apparatus of an embodiment in accordance with the present disclosure. In FIG. 2, the class registration table is stored at a database 201. A codes loading apparatus 202 provided by the embodiment is located at a server 203 that is connected with the database 202. The codes loading apparatus 202 can communicate with the database 201 to read the class registration information stored in the database 201.

Java class is normally packed in a zip package with a jar format. This embodiment accepts this method. By reference to FIG. 2, in this embodiment, after the Java class is packed into jar package, the jar package is uploaded to a Subversion (SVN) server 204. The SVN server stores the jar package and records the version information of each jar package. SVN is a popular source code version control system. The SVN server 204 is a server used by Subversion to store and manage the source code. Each jar package stored in the SVN search has a SVN address and can be found according to the SVN address.

In FIG. 2, the SVN server 204 is connected with the server 203. The codes loading apparatus 202 at the server 203 can communicate with the SVN server 204 and obtain each Java class from the SVN server 204 according to the respective SVN address of each Java class.

Table 1 below is an example of the class registration table provided by an embodiment of the present disclosure. The information recorded in the class registration table includes Java class name, a name of a jar package whether the Java class belongs, and a SVN address of the jar package where the Java class belongs.

In the example given in Table 1, the Java class name is com.foo.hellowrold. The name of the jar package where the Java class belongs is hello-biz. The SVN address of the jar package where the Java class belongs is http://svn.foo-inc.com/repos/example/hellojar.

TABLE 1

| Field | Type | Meaning | Notes |
|---|---|---|---|
| CLASS_NAME | VARCHAR (100) | Java class name | Such as com.foo.helloworld |
| JAR_NAME | VARCHAR (100) | Jar package name | Such as hello-biz |
| SVN_URL | VARCHAR (200) | SVN address corresponding to the Jar package | SVN address, such as http://syn.foo-inc.com/repos/example/hellojar |

The SVN server 204 records every update of the Java class. After a user revises the Java code and submits the revised Java code to the SVN server 204 through SVN client software. The SVN server 204 will generate a new version of the revised Java code and record the new version. In practice, the version number can be used to record the Java code of each version. For the same Java class, the newer the version the higher the version number will be. For example, one Java class' version number is 15516. After the user revises the Java class and submits the revision to the SVN server, the SVN server 204 will update the version number to 15517 and the prior version 15516 becomes a historical version.

To improve speed of data search, in some embodiments of the present disclosure, the finding unit 102 can record the address information and the version information of the first Java class through a class address table and a class version table respectively.

Specifically, a primary key of the class address table records the class name of the first Java class. A value of the primary key of the class address table records the storing address of the first Java class.

TABLE 2

| Key | Java class name, such as com.foo.helloworld |
|---|---|
| Value | The SVN address of the jar package where the Java class belongs, such as http://svn.foo-inc.com/repos/example/hellojar |

Table 2 is an example of the class address table. As shown in the table above, the Java class is packed in the jar package. The jar package is stored in the SVN server 204. The class address table records the class name through the primary key. In the example of Table 2, the class name is com.foo.hellowrold. The class address table records the SVN address of the jar package where the Java class belongs. In the example of Table 2, the address is http://svn.foo-inc.com/repos/example/hellojar.

TABLE 3

| Key | Java class name, such as com.foo.helloworld |
|---|---|
| Value | The version number of the jar package where the Java class belongs, such as 22162 |

Figure 3:
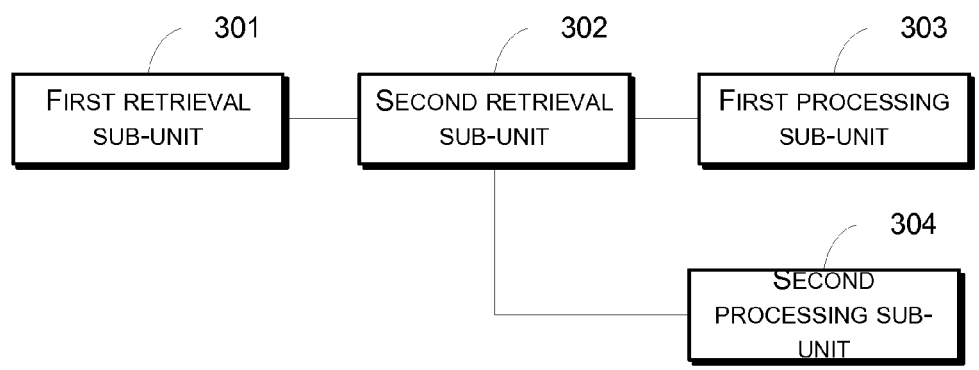
FIG. 3 illustrates a unit in an apparatus of an exemplary embodiment in accordance with the present disclosure.

Table 3 is an example of the class version table. The primary key is used to record the class name. In the example of FIG. 3, the class name is com.foo.helloworld. The value of the primary key is used to record the prior loaded version of the jar package where the Java class belongs. In the example of FIG. 3, the prior loaded version of the jar package where the com.foo.helloworld class belongs is 22162.

The determination unit 103 is configured to determine whether the latest version number of the first Java class is the same as a version number of the first Java class that is previously loaded and locally stored.

The class registration information records information of all recorded classes. In this embodiment of the present disclosure, the class address and version information are recorded through the class address table and the class version table.

The processing unit 104 is configured to obtain a latest version of the first Java class from the storing address of the first Java class to load and update the version number of the first Java class when the latest version of the first Java class is different from the version number of the first Java class that is previously loaded and locally stored. When the latest version of the first Java class is not different from the version number of the first Java class previously loaded and locally stored, the processing unit 104 directly loads the first Java class.

When the processing unit 104 loads class every time, it will determine whether there is an update of the jar package where the class stored in the SVN server 204. If there is an update, the processing unit 104 will update a corresponding version in the class version table to a latest value of the primary key.

In this embodiment, when a specific Java class has already been loaded and the version is the same, the codes loading apparatus 202 will directly load and run the class locally. If the version is not the same, the codes loading apparatus 202 needs to obtain the latest version of the Java class from the server 203 and then load and run the latest version.

By reference to FIG. 3, a codes loading apparatus 202 according to one embodiment of the present disclosure packs a Java class into a zip package of jar format and stores the jar package into the SVN server 204. As shown in FIG. 3, the processing unit 104 as shown in FIG. 1 may include: a first retrieval sub-unit 301, a second retrieval sub-unit 302, a first processing sub-unit 303, and a second processing sub-unit 304.

The first retrieval unit 301 is configured to obtain the SVN address of the jar package where the latest version of the Java class belongs when the latest version of the first Java class is different from the version number of the first Java class that is previously loaded and locally stored.

The second retrieval unit 302 is configured to obtain the latest version of the Java class according to the SVN address.

The first processing unit 303 is configured to load the first Java class and update the version number of the first Java class in class version records.

The second processing unit 304 is configured to directly load the first Java class when the latest version of the first Java class is the same as the version number of the first Java class that is previously loaded and locally stored Existing techniques for update of codes require frequently publishing the latest codes to each server of the cluster. It is time consuming and tends to waste human and physical resources. When there are many servers in the cluster, the efficiency in loading of codes is especially low. The codes loading apparatus 202 provided by the present disclosure does not need to publish the latest codes to each server in the cluster and does not need to restart the Java application in each server of the cluster. The codes loading apparatus 202 only needs to update the codes in the codes storage server, such as the SVN server 204. Each server in the system will automatically load the latest codes, thereby improving the usability of the Java cluster system and the efficiency in loading of codes.

In addition, under the existing codes updating techniques, in the codes loading process, if one or more servers in the cluster misses updating or fails updating, codes with different version will run at the same time on different servers in the cluster. Such situation might damage data and cause irreversible serious consequences. The codes loading apparatus 202 provided by the present disclosure causes each server to update according to the codes in the codes storage server, such as the SVN server 204, and guarantees that each server can automatically load the latest version, thereby avoiding the damage to data arising from the situation that different versions of codes are run at the same time on different servers. The proposed techniques of the present disclosure also avoid the occurrence of irreversible serious consequences, and improve the stability of operation of the whole cluster-based Java application system.

Figure 4:
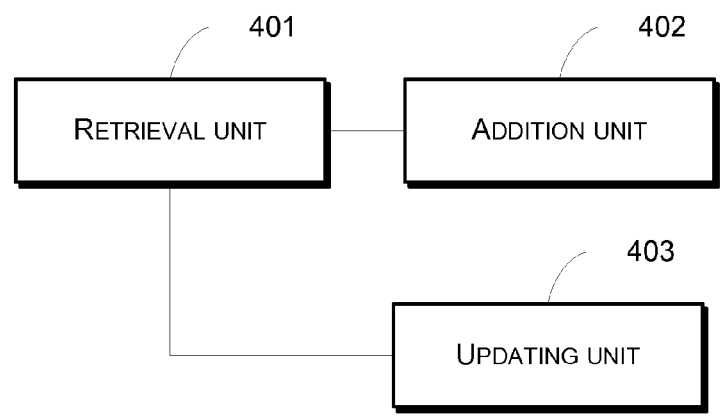
FIG. 4 illustrates a diagram of an exemplary system in accordance with the present disclosure.

To further guarantee that the codes loading apparatus 202 can obtain the accurate and complete class information from the class registration table, the present disclosure also provides a class registration system specifically to maintain the class registration table. By reference to FIG. 4, the class registration system may include: a retrieval unit 401, an addition unit 402, and an updating unit 403.

The retrieval unit 401 is configured to obtain a Java class database according to a received storing address of Java class database.

The addition unit 402 is configured to traverse the Java class database and to insert into the class registration table a new class that is unrecorded in a class registration table yet is included in the Java class database.

The updating unit 403 is configured to traverse the Java class database and update the storing address of corresponding Java class in the class registration table according to the storing address of Java class recorded in the Java class database.

The class registration system provided by the present disclosure can instantly record the new class in the Java class database into the class registration table, and update the corresponding Java class' storing address in the class registration table according to the storing address of each Java class recorded in the Java class database. This guarantees that the class registration table will record the latest and complete Java class information to provide powerful protection of loading operation of the system.

One embodiment of the present disclosure provides a method for loading codes of cluster-based Java application system to be used in a server of the Java cluster. By reference to FIG. 5, the method is described below.

At S501, the method receives, from a server, a request for loading class, the request for loading class including a class name of a first Java class to be loaded.

At S502, the method finds a storing address of the first Java class from a class registration table according to the class name, and obtains a latest version number of the first Java class from the storing address of the first Java class according to the storing address.

To improve speed of data search, in some embodiments of the present disclosure, a class address table can be used to record contents in the class registration table. Specifically, a primary key of the class address table records the class name of the first Java class. A value of the primary key of the class address table records the storing address of the first Java class.

Optionally, a class version table is used to record version information of the first Java class. Specifically, a primary key of the class version table is used to record the class name. A value of the primary key of the class version table is used to record the prior loaded version of the first Java class.

At S503, the method determines whether the latest version number of the first Java class is the same as a version number of the first Java class that is previously loaded and locally stored.

At 504, in an event that the latest version of the first Java class is different from the version number of the first Java class that is previously loaded and locally stored, the method loads the latest version of the first Java class and updates the version number of the first Java class in the class version record; if otherwise, the method directly loads the first Java class.

Figure 5:
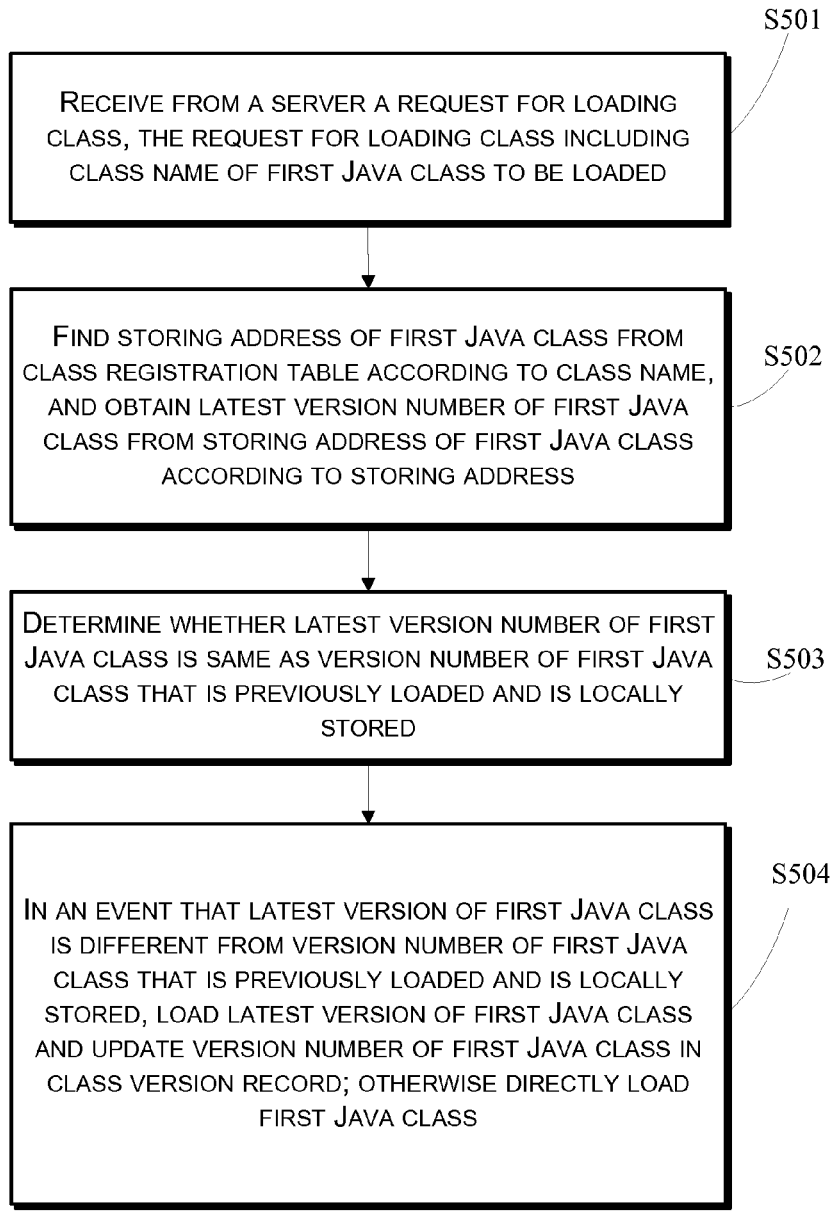
FIG. 5 illustrates a flow chart of an exemplary method in accordance with the present disclosure.
Figure 6:
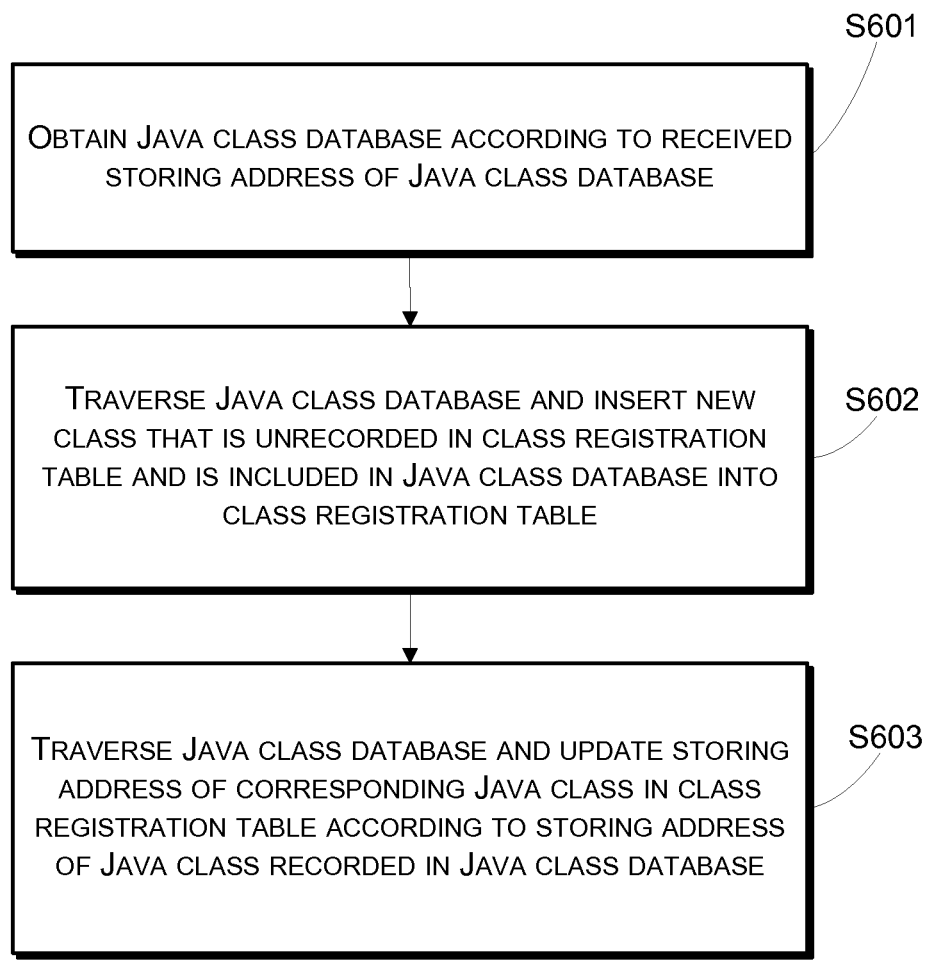
FIG. 6 illustrates a flow chart of another exemplary method in accordance with the present disclosure.

To further guarantee the implementation of the loading method as shown in FIG. 5, one embodiment of the present disclosure also provides a method for class registration. By reference to FIG. 6, the method is described below.

At S601, the method obtains a Java class database according to a received storing address of the Java class database.

At S602, the method traverses the Java class database and inserts into the class registration table a new class that is unrecorded in class registration table and included in the Java class database.

The contents of the class registration table include the class name, the class database name, and the storing address of the class database.

At S603, the method traverses the Java class database and updates the storing address of corresponding Java class in the class registration table according to the storing address of Java class recorded in the Java class database.

The method provided by the present disclosure implements registration of the new class and guarantees the completeness of the Java database through the action S602. The method also updates the storing address of each Java class in real-time and guarantees the accuracy of information stored in the Java database through the action S603, thereby guaranteeing implementation of the method as shown in FIG. 5.

Figure 7:
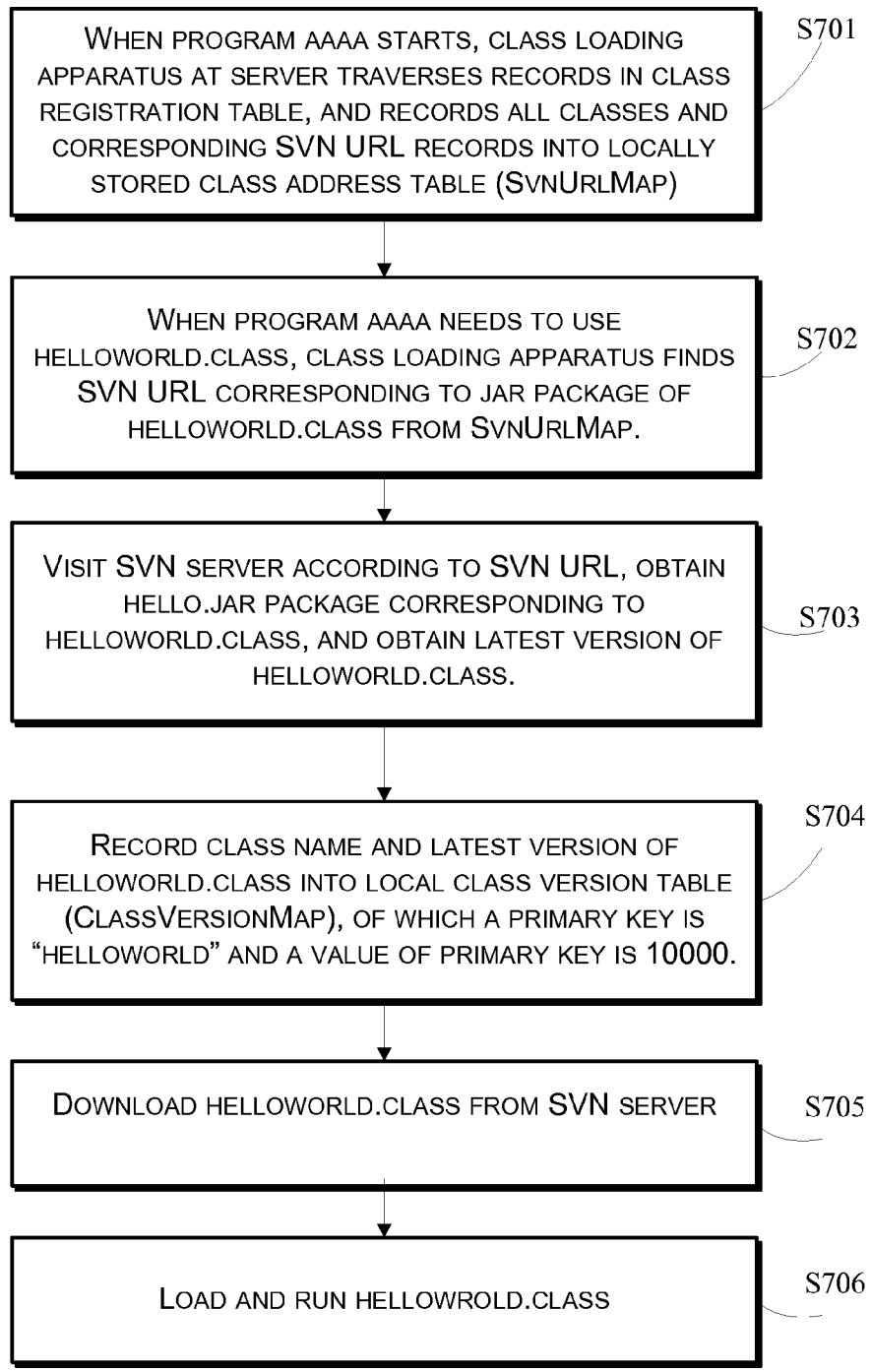
FIG. 7 illustrates a flow chart of an exemplary method in accordance with the present disclosure.

FIG. 7 provides a codes apparatus method provided by one embodiment of the present disclosure. As an example for illustration purpose, a programmer A writes a Java class, a function of which is to print "hello, world" at a webpage. A class name of the Java class is helloworld.class. The Java class is packed into the hello.jar Java package, and is uploaded to a SVN server.

In this embodiment, all classes in the hello.jar Java package and a URL of a corresponding SVN server of the hello.jar Java package are recorded into the class registration table.

When a program AAAA at a server in the Java cluster needs to use the hello.world class, the codes apparatus method provides by the present disclosure carries out a number of actions as described below.

At S701, when the program AAAA starts, a class loading apparatus at the server traverses records in the class registration table, and records all classes and corresponding SVN URL records into a locally stored class address table (SvnUrlMap).

At S702, when the program AAAA needs to use helloworld.class, the class loading apparatus finds the SVN URL corresponding to the jar package of the helloworld.class from the SvnUrlMap.

At S703, the method visits SVN server according to the SVN URL, obtains the hello.jar package corresponding to the helloworld.class, and obtains the latest version of the helloworld.class.

For example, the current latest version of the helloworld.class is 10000.

At S704, the method records a class name and a latest version of the helloworld.class into a local class version table (ClassVersionMap). A primary key of the ClassVersionMap is "helloworld" and a value of the primary key is 10000.

At S705, the method downloads the helloworld.class from the SVN server.

At S706, the method loads the hellowrold.class and runs the helloworld.class.

Assuming afterward the programmer A revises the helloworld.class, repacks the hello.jar, and submits it to the SVN server, the SVN server accepts the latest hllow.jar and generates a latest version number 10001.

Figure 8:
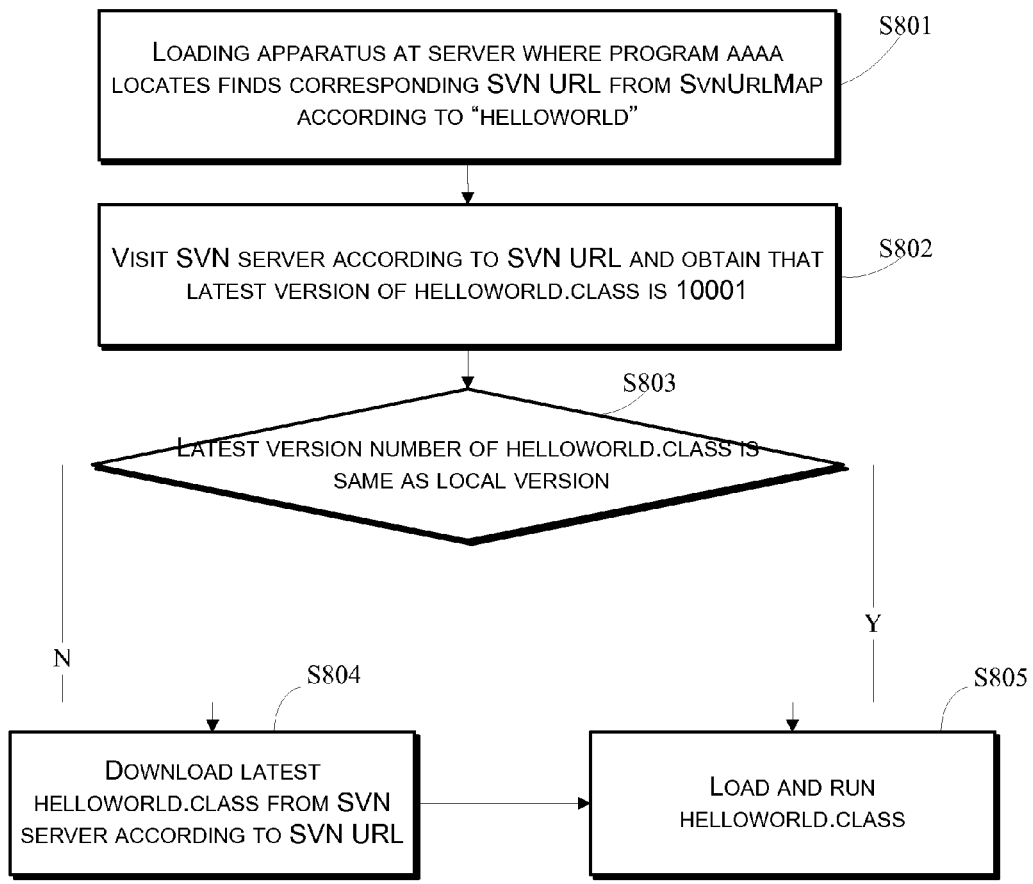
FIG. 8 illustrates a flow chart of an exemplary method in accordance with the present disclosure.

If the program AAAA runs again, when it needs to use the helloworld.class, by reference to FIG. 8, one embodiment of the present disclosure provides a loading method as described below.

At S801, the loading apparatus at the server where the program AAAA is located finds the corresponding SVN URL from the SvnUrlMap according to the "helloworld".

According to the method as shown in FIG. 7, information of helloworld class has been recorded. When the method uses the class again, it can directly search the corresponding URL of the class at the local SvnUrlMap.

At S802, the method visits the SVN server according to the SVN URL and obtains that the latest version of the helloworld.class, which is 10001 in this example.

At S803, the method compares the latest version number of the helloworld.class with the version number of the helloworld.class locally stored in the ClassVersionMap. If the two are the same, the method proceeds to action S805; otherwise, the method continues to action S804.

In this embodiment, the locally recorded version number of the helloworld.class is 10000 while the latest version number of the helloworld.cass from the SVN server is 10001. After comparison, the latest version number of the helloworld.class is higher than the locally recorded version number. This indicates that the helloworld.class has been updated.

At S804, the method downloads the latest helloworld.class from the SVN server according to the SVN URL.

At S805, the method loads the helloworld.class and runs the helloworld.class.

The method pre-records each new class. When a specific class might be used, a storing address for the class is obtained according to the registration information of the class, and a version information of the class is obtained from the storage location of the class according to the storing address. After comparison, the latest version of the class is obtained, loaded, and used. The method does not need to publish the latest codes to each server in the cluster, and does not need to restart the Java application in each server in the cluster. The codes only need to be stored in a codes storage server, such as the SVN server 204, for updates. Each server in the cluster will automatically load the latest codes, thereby improving the usability of the Java cluster system as well as improving the codes loading efficiency.

For the sake of convenient description, the above-described systems and apparatus are functionally divided into various units which are separately described. When implementing the disclosed systems and apparatus, the functions of various units may be implemented in one or more instances of software and/or hardware.

From the exemplary embodiments described above, one of ordinary skill in the art can clearly understand that the disclosed method and system may be implemented using software and universal hardware platform. Based on this understanding, the technical scheme of the present disclosure, or portions contributing to existing technologies, may be implemented in the form of software products which are stored in one or more computer-readable storage media such as ROM/RAM, hard drive and optical disk. The software includes instructions for a computing device (e.g., personal computer, server or networked device) to execute any the methods described in the exemplary embodiments of the present disclosure.

The various exemplary embodiments are progressively described in the present disclosure. Same or similar portions of the exemplary embodiments can be mutually referenced. Each exemplary embodiment has a different focus than other exemplary embodiments. In particular, each exemplary system embodiment has been described in a relatively simple manner because of its fundamental correspondence with the exemplary method. Details thereof can be referred to related portions of the exemplary method.

The present disclosure may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described within a general context of computer-executable instructions executed by a computer, such as a program module. Generally, a program module includes routines, programs, objects, modules, and data structure, etc., for executing specific tasks or implementing specific abstract data types. The disclosed method and server may also be implemented in a distributed computing environment. In the distributed computing environment, a task is executed by remote processing devices which are connected through a communication network. In distributed computing environment, the program module may be located in storage media (which include storage devices) of local and remote computers.

Although the embodiments describe the present disclosure, it is appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. An apparatus comprising:
one or more processors;
memory;
a receiving unit stored in the memory and executable by the one or more processors that receives a request from a server to load codes of a cluster-based Java application system that is associated with a cluster of servers, the request including a class name of a first Java class to be loaded;
a finding unit stored in the memory and executable by the one or more processors that finds a storing address of an entity of the first Java class from class registration information according to the class name, and obtains a latest version number of the first Java class according to the storing address;
a determination unit stored in the memory and executable by the one or more processors that determines whether the latest version number of the first Java class is same as a version number of the first Java class that is previously loaded and locally stored; and
a processing unit stored in the memory and executable by the one or more processors that obtains the latest version of the first Java class from the storing address to load the class and updates the latest version number of the first Java class in class version records when the latest version of the first Java class is not the same as the version number of the first Java class that is previously loaded and locally stored, and directly loads the first Java class when the latest version of the first Java class is the same as the version number of the first Java class that is previously loaded and locally stored.

2. The apparatus as recited in claim 1, wherein the finding unit records content of the class registration information in a class address table.

3. The apparatus as recited in claim 2, wherein a primary key of the class address table records the class name of the first Java class, and wherein a value of the primary key of the class address table records the storing address of the first Java class.

4. The apparatus as recited in claim 1, wherein the finding unit records version information of the first Java class in a class version table.

5. The apparatus as recited in claim 4, wherein a primary key of the class version table records the class name of the first Java class, and wherein a value of the primary key of the class version table records the version number of the previously loaded Java class.

6. A system for class registration used to maintain class registration information, the system comprising:
one or more processors;
memory;
a retrieval unit stored in the memory and executable by the one or more processors that obtains a Java class database according to a storing address of the Java class database;
an addition unit stored in the memory and executable by the one or more processors that traverses the Java class database and inserts into the class registration information a new class that is unrecorded in the class registration information and included in the Java class database; and
an updating unit stored in the memory and executable by the one or more processors that traverses the Java class database and updates a storing address of a corresponding Java class in the class registration information according to a respective storing address of the corresponding Java class recorded in the Java class database.

7. The system as recited in claim 6, wherein the class registration information comprises a class name, a class database name, and the storing address of the Java class database.

8. A method comprising:
receiving from a server a request for loading codes of a cluster-based Java application system that is associated with a cluster of servers, the request including a class name of a first Java class to be loaded;
finding a storing address of the first Java class from class registration information according to the class name;
obtaining a latest version number of the first Java class according to the storing address;
determining whether the latest version number of the first Java class is same as a version number of the first Java class that is previously loaded and locally stored;
in an event that the latest version of the first Java class is not the same as the version number of the first Java class that is previously loaded and locally stored, loading the latest version of the first Java class and updating the version number of the first Java class in class version records; and
in an event that the latest version of the first Java class is the same as the version number of the first Java class that is previously loaded and locally stored, directly loading the first Java class.

9. The method as recited in claim 8, wherein contents of the class registration information are recorded in a class address table.

10. The method as recited in claim 9, wherein the contents of the class registration information that are recorded in the class address table comprise:
a primary key of the class address table recording the class name of the first Java class; and
a value of the primary key of the class address table recording the storing address of the first Java class.

11. The method as recited in claim 8, wherein contents of the class registration information are recorded in a class version table.

12. The method as recited in claim 11, wherein version information of the first Java class recorded in the class version table comprises:
a primary key of the class version table recording the class name of the first Java class; and
a value of the primary key of the class version table recording the version number of the previously loaded Java class.

13. A method for class registration, the method comprising:
obtaining a Java class database according to a storing address of the Java class database;
traversing the Java class database and inserting into class registration information a new class that is unrecorded in the class registration information and included in the Java class database; and
traversing the Java class database and updating a storing address of a corresponding Java class in the class registration information according to a storing address of the corresponding Java class recorded in the Java class database.

14. The method as recited in claim 13, wherein the class registration information comprises a class name, a class database name, and the storing address of the Java class database.

* * * * *